United States Patent
Qiao

(10) Patent No.: US 8,525,977 B2
(45) Date of Patent: Sep. 3, 2013

(54) PHASE MEASUREMENT CALIBRATING METHOD AND CALIBRATING DEVICE BASED ON LIQUID CRYSTAL LIGHT VALVE PRINCIPLE

(76) Inventor: Baiwen Qiao, Changzhou (CN)

( * ) Notice: Subject to any disclaimer, the term of this patent is extended or adjusted under 35 U.S.C. 154(b) by 0 days.

(21) Appl. No.: 13/394,152

(22) PCT Filed: Aug. 27, 2010

(86) PCT No.: PCT/CN2010/001300
§ 371 (c)(1),
(2), (4) Date: Mar. 5, 2012

(87) PCT Pub. No.: WO2011/079497
PCT Pub. Date: Jul. 7, 2011

(65) Prior Publication Data
US 2012/0176594 A1    Jul. 12, 2012

(30) Foreign Application Priority Data
Dec. 29, 2009 (CN) .......................... 2009 1 0214576

(51) Int. Cl.
*G01C 3/08* (2006.01)
(52) U.S. Cl.
USPC ............ 356/4.01; 356/4.1; 356/5.01; 356/5.1
(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS
5,208,642 A * 5/1993 Narutaki ...................... 356/5.12

FOREIGN PATENT DOCUMENTS
CN    1123573 A    5/1996
CN    1241261 A    1/2000
(Continued)

OTHER PUBLICATIONS

Yang Dalin, The Automatic Light Intensity Control System with Liquid Crystal Light Valve in Electro Optical Distance Meter, Acta Geodetica et Cartographica Sinica, Nov. 1983, vol. 12, No. 4, p. 286 line17—p. 288, fig. 12.

*Primary Examiner* — Luke Ratcliffe
(74) *Attorney, Agent, or Firm* — George D. Liu; Ronda IP Agent Co. Ltd

(57) ABSTRACT

Phase measurement calibrating method, calibrating device and ranging device based on the liquid crystal shutter principle are disclosed. A light wave is emitted by a light wave emitter (1) to a tested target through a first liquid crystal shutter (3). The light wave is reflected and returned from the tested target to be focused by an optical device, and is received by a receiver (7). The received light wave is used as the external light path beam of the measurement system. While the light wave is passing through the first liquid crystal shutter (3), a part of the light wave is reflected by the first liquid, crystal shutter (3) to pass through a second liquid crystal shutter (4). The light wave passing through the second liquid crystal shutter (4) is received directly by the receiver (7) and used as the internal light path beam for fundamental reference of the system phase measurement. The first liquid crystal shutter (3) and the second liquid crystal shutter (4) are switched respectively while the system operates so that the receiver (7) is utilized for comparing phases of the internal light path beam and the external light path beam received respectively to output phase shift for eliminating a fundamental reference. The calibrating method achieves phase compensation and calibration, increases measurement accuracy of a laser ranging operation, and enhances ranging stability of the system.

9 Claims, 11 Drawing Sheets

(56) References Cited

FOREIGN PATENT DOCUMENTS

| | | |
|---|---|---|
| CN | 101581783 A | 11/2009 |
| CN | 101738616 A | 6/2010 |
| EP | 0821215 A3 | 7/1998 |
| JP | 763510 A | 3/1995 |
| JP | 2006329797 A | 12/2006 |

* cited by examiner

PHASE MEASUREMENT CALIBRATING METHOD AND CALIBRATING DEVICE BASED ON LIQUID CRYSTAL LIGHT VALVE PRINCIPLE

CROSS REFERENCE TO RELATED APPLICATIONS

The present application is a national phase entry under 35 U.S.C. §371 of International Application No. PCT/CN2010/001300 filed Aug. 27, 2010, published in Chinese, which claims the benefit of Chinese Patent Application No. 200910214576.7 filed Dec. 29, 2009. The disclosure of said applications are incorporated by reference herein.

FIELD OF THE INVENTION

The present invention relates to the art of optoelectronic measurements and, more particularly, to a phase measurement calibrating method, calibrating device and distance measuring device based on the liquid crystal shutter principle.

BACKGROUND OF THE INVENTION

The technology and principle of optoelectronic distance measurement instrument have developed quickly for more than sixty years since the first patent of an optoelectronic distance measurement instrument was applied in 1947. The optoelectronic distance measurement instrument plays an important role in high-precision measurement, combining with other technology to form multi-function total-station surveying instrument. However, the large-sized surveying instruments are extraordinarily expensive, and the size and weight limit themselves to widely utilized in application field of middle-precision distance measurement for less than 200 meters before 1990s. The low-precision with accuracy up to 2 centimeter ultrasonic ranging devices have been mass produced.

Semiconductor laser diode and digital electronic circuit make great progress until in the late 1990 of the 20th century, and laser become widely used for measuring, phase-shift measuring distance device of millimeter-level measurement accuracy holds a leading post for short-distance measurement for up to 200 meters. Due to the cost effect of handheld short-distance measurement device and the performance difference to the mentioned high-precision long-distance optoelectronic distance instruments, the inventors try their best to research the small-sized short-distance laser distance measurement device.

Laser measuring distance device based on phase shift principle blazes at a tested target by a modulated laser beam, and then a part of the light wave is reflected by the target with corresponding phase shift which is used for distance calculation. However, the measurement accuracy is influenced by the performances of internal electronic components. Higher measurement accuracy requires more precise circuits and relative system design, and importantly the phase drift due to environmental factors on those components should be carefully considered, such as the temperature and the element's life of duty. Generally, well known technique for compensation of the phase shift between internal and external light paths result in elimination of the additional phase drift, and its principle can be illustrated as follows:

$\Psi_{in}$ is defined as phase of an internal light path beam, while $\Psi_{out}$ is defined as phase of an external light path beam, and $\Delta\Psi$ is defined as additional phase shift which is generated during the transmission of circuit and photovoltaic conversion. The internal light path beam $e_{in}$ and the external light path beam $e_{out}$ are discriminated respectively by a phase discriminator and have the relation as follows:

$$\Phi_{in} = \Psi_{in} + \Delta\Psi$$

$$\Phi_{out} = \Psi_{out} + \Delta\Psi$$

Wherein $\Delta\Psi$ is unexpected phase drift depending on different environment, and is unable to be calculated exactly. If the interval switching internal and external light path beams is fast enough, that $\Delta\Psi$ is thought to the same. Thus the phase difference of the internal and external light path beams is shown as following results:

$$\Phi = \Phi_{out} - \Phi_{in} = \Psi_{out} - \Psi_{in}$$

Thereby the phase difference $\Phi$ has completely eliminated the expected phase which is caused by those environmental and aging factors, in other words, the measurement precision is extremely enhanced.

In prior art, a light beam switching device is used to change light path in order to get internal and external light paths, and electro-mechanical component is widely utilized for this application. However, the response time of this method is as long as hundreds milliseconds, moreover, the large-size device with light beam switching device makes the control circuit complex and leads to higher costs and power consumption. In another prior art, a light wave emitter generates one light wave which is divided into internal and external light path beam by a beam-splitter. Two avalanche photo diodes (APD) become receiver for respectively receiving internal and external light path beams transmitted consequently at the same time. However, two APDs hugely increase system expense.

In another prior art, dual laser diodes (LD) respectively generate internal and external light path beams, and one APD respectively receive the internal and external light path beams to eliminate a fundamental reference. Firstly, the two LDs work in totally different environment and modulation period, which are unable to completely eliminate a fundamental reference; secondly, the discreteness of LD directly results different phase drift even at the same working conditions.

The mentioned three calibration methods in prior art have disadvantages as follows:

(1) Single-emitter and single-receiver system, which means that generating one light path and receiving one light path wherein there is a controlled electro-mechanical component to change internal and external light path beams, and calculating the phases shift of internal and external light wave respectively for phase compensation, thus the unexpected influence of the environment and element aging is eliminated. However, the electro-mechanical switch causes long response time and high costs and power consumption. In the other way, not only the structure of the system is complex, but also it is easy to make mechanical wear causing a short service life, therefore, this method is not widely utilized in industrial application fields.

(2) Single-emitter and dual-receiver system, which means that system generates one light wave and dual receivers respectively receive internal and external light path beams. The phase shifts of internal and external light wave are calculated respectively to get the phase difference, so the unexpected influence of the environment is eliminated. However, this system installs two APDs for respectively receiving internal and external light path beams, thus it cause high system cost.

(3) Dual-emitter and single-receiver system, which means that system generates two light waves and a single-receiver receives these internal and external beams respectively. The phase shift of internal and external light path beams is calculated respectively, thus the unexpected influence of the environment is eliminated. The system installs two light emitters (such as laser diode), and they cause different phase drift due to different temperatures and aging, as a result, phase compensation between two laser diodes cause errors occur during calibrating.

According above discussion, these methods all have limitation in real application.

SUMMARY OF THE INVENTION

As compared with the prior art, the present invention provides a phase measurement calibrating method, calibrating device and distance measuring device based on the liquid crystal shutter (LCS) principle, that is able to achieve short response time, low cost, long life of duty and avoid the modulation frequency interference.

In the exemplary embodiment of the invention, generally, the phase measurement calibrating method based on the liquid crystal shutter (LCS) principle comprises the steps of: (a) a light wave emitted by a light emitter to a tested target through a first liquid crystal shutter, being reflected by the target, being focused by an optical device, being received by a receiver, then being used as an external light path beam of the measurement system; (b) while the light wave is passing through the first liquid crystal shutter, a part of the light wave being reflected by the first liquid crystal shutter or other reflector to pass through a second liquid crystal shutter, the light wave passing through the second liquid crystal shutter being received directly by the receiver and used as an internal light path beam for fundamental reference of the system phase measurement; (c) the first liquid crystal shutter and the second liquid crystal shutter being switched respectively while the system operates, so that the receiver being utilized for comparing phases of the internal and external light path beams received respectively to output phase shift for eliminating the fundamental reference.

As disclosed herein, the phase measurement calibrating device for measuring phase based on LCS includes: (a) a light emitter, used for generating a light wave which having stable modulation frequencies, phases and amplitudes; (b) an optoelectronic converter, used for respectively receiving the external light path beam which is reflected by a tested target and internal light path beam which is reflected by a first liquid crystal shutter (LCS) or other internal reflector; (c) a first and second liquid crystal shutter (LCS), as electronic-control optical switches, used for switching internal and external light path beams, which could be liquid crystal display, voltage controlled quartz shutter or others voltage controlled crystal shutter; (d) a phase discriminator, used for respectively receiving output signals from the optoelectronic converter followed by signal filters and amplifiers, and then comparing them for outputting phase shift for eliminating the fundamental reference caused by the unexpected phase drift; (e) a mixer, used for respectively mixing internal and external signals from the optoelectronic converter with a mixing signal, and then amplifying them to the phase discriminator; (f) the optoelectronic converter and the mixer are comprising of a receiver which could be a photodiode, an avalanche photodiode or a photomultiplier tube (PMT); (g) an oscillator, used for generating and outputting high-frequency oscillation signal and local oscillator signal, which could be crystal oscillator, phase-locked loop, frequency multiplier, frequency divider or direct digital frequency synthesis; (h) an amplifier, used for receiving the output signal from the optoelectronic converter and amplifying them to output.

The light wave emitter drives high-frequency oscillation signal and modulates into light wave, then a part of the light wave reaches the tested target through the first LCS as the external light path beam; when a part of the light wave is reflected by the first LCS or other internal reflector and then through the second LCS, as the internal light path beam. The optoelectronic converter receives the external and internal light path beams and then converts them into electronic signal for output. The phase discriminator receives the internal and light path respectively and then compares them for eliminating the fundamental reference caused by the unexpected phase drift.

The light wave emitter includes a clock generator, a modulator and a light source, wherein the driver drives the light emitter to emit light, the light wave emitter could be laser diode (LD), light emitting diode (LED) and other light-emitting elements.

Both the first and second LCSs include a driving circuit, LCS, and relative optical elements, wherein the optical element is used to make the first and second LCS in a close-loop system. The LCS could be crystal shutter or other optoelectronic switches.

Both the first and second LCSs are directed to the optoelectronic converter, so the light wave reaches the receiver directly. There might be a reflector between the second LCS and the receiver to change the light path for a better optical signal. There might be optical signal transmission lines connecting the second LCS to the receiver, and the optical signal transmission lines could be optical fiber, optical tube, or other optical elements.

The optoelectronic converter could be photodiode, APD or PMT and the like.

The optoelectronic converter may be receive the external light path beam before or after receiving the internal light beam.

The light wave emitter, the optoelectronic converter, the first and second LCS, the phase discriminator, the mixer, the receiver, the oscillator and the amplifier are mounted on a base, a lens is disposed on the front of the light wave emitter, and the light wave arrives at the target by the first LCS. A receiving lens is mounted on the base, and the light wave reflected by the target is focused by the receiving lens. The receiver is deposed on the back of the receiving lens, and the lens is disposed on the front of the receiver, and the second LCS is between the first LCS and the receiver.

Both the first and second LCSs are directed to the optoelectronic converter, so that the light wave directly passes through the optoelectronic converter.

One or more reflectors are positioned between the second LCS and the optoelectronic converter in order to change the light path, which is convenient for signal conditioning received by the optoelectronic converter.

There might be optical signal transmission lines connecting the second LCS and the optoelectronic converter, and the optical signal transmission lines may be optical fiber or optical tube.

The receiver may comprise of the optoelectronic converter and the mixer.

The receiver may be an optoelectronic mixer.

The present invention also provides a phase measurement device based on the LCS principle comprising: a light wave emitter, used for emitting light wave; a first LCS, used for switching the external light path beam to a target; a receiving lens, used for receiving reflected light wave by the target; a receiver, used for receiving the light wave of the measurement system; a second LCS, used for switching part of reflected light wave by the first LCS or internal reflector, and forming an internal light path beam for fundamental reference of the system phase measurement; wherein the first and second LCSs are switched respectively, therefore, the receiver compares phases of the internal and external light path beams received respectively to output phase shift for eliminating the fundamental reference.

Specially, the phase shift distance measurement device based on the LCS principle includes an oscillator, a light wave emitter, a first and second LCS, an optoelectronic converter, signal amplifiers, a mixer, and a phase discriminator. During the device operation, the oscillator generates high-frequency oscillation emitting signal and local oscillation signal, and the light wave emitter modulates the oscillation signal into light beam. The optical signal arrives at the target through the first LCS, then is reflected by the target, and the optoelectronic converter receives and converts reflected external light path beam to output electronic signal as high-frequency signal, the electronic signal is amplified by the signal amplifier, and the consequent mixer mixes the high-frequency amplified signal with the local oscillation signal before outputting mixed signals, and the mixed signal is acquired by the phase discriminator after being amplified by corresponding signal amplifier, and the internal and external light path beams are respectively discriminated by the phase discriminator, then phase discriminator outputs phase difference.

In the embodiment of the invention, the oscillator could be crystal, crystal oscillator, phase-locked loops (PLL), direct digital frequency synthesis (DDS), or other frequency generator and circuit.

In the embodiment of the invention, the mixer could be analog multiplier, down-conversion mixer, or other optoelectronic mixer, such as photodiode, APD, PMT, and as the like.

In the embodiment of the invention, the optoelectronic converter and the mixer could be instead of the receiver which is able to act as the optoelectronic converter and the mixer simultaneously. The receiver could be photodiode, APD, PMT, and as the like.

The high-frequency amplifier is used for receiving and amplifying the high-frequency signal, while the low-frequency amplifier is used for amplifying the low-frequency mixed signal.

Both the high-frequency amplifier and the low-frequency amplifier may be not installed, or one of them may be not installed. The high-frequency amplifier may be not installed if the receiver acts as the optoelectronic converter and frequency mixer, and then the receiver directly connects the low-frequency amplifier to increase system signal noise ratio and reduce cost.

The distance measurement device of the present invention adopts the phase measurement calibrating method and the calibrating device based on the LCS principle of the present invention.

The present invention adopts a single light wave emitter that respectively generates internal and external light path beam, and adopts a signal receiver respectively receiving internal and external light path beams both of which is compared to get phase shift for phase compensation and phase calibration, thus unexpected phase drift caused by environment and component aging is eliminated, and both measurement accuracy of laser distance measurement system's stability are hugely increased, and the influence of environmental factors is eliminated, and requirement for high-performance of elements is eliminated that makes cost down and it is benefit for widely applications.

DESCRIPTION OF THE DRAWINGS

The drawings described below are for illustration purposes only. The drawings are not intended to limit the scope of the present teachings in any way.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail.

Figure 1:
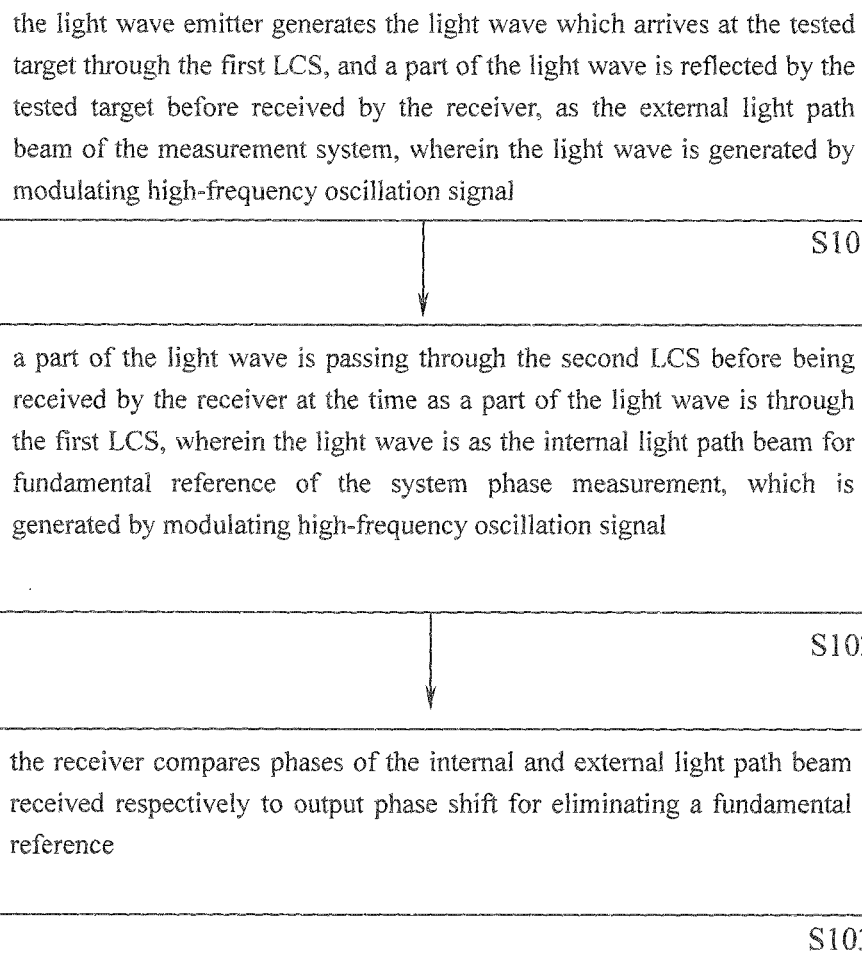
FIG. 1 is a flow chart of the phase measurement calibrating method based on the LCS principle in accordance with the present invention.

Referring to FIG. 1, the phase measurement calibrating method based on the LCS principle in accordance with the present invention is illustrated as follows:

The phase measurement calibrating method adopts single-emission and single-receiving double light paths, the light wave emitter generates respectively the internal and external light path beam, and the receiver receives respectively the internal and reflected external light path beam and then compares them. By eliminating a fundamental reference caused by the phase drift, the phase difference is right for phase compensation and phase calibration.

In the step 101, the light wave emitter generates the light wave which arrives at the tested target through the first LCS, and a part of the light wave is reflected by the tested target before received by the receiver, as the external light path beam of the measurement system, wherein the light wave is generated by modulating high-frequency oscillation signal.

In the step 102, a part of the light wave is passing through the second LCS before being received by the receiver at the time as a part of the light wave is through the first LCS, wherein the light wave is as the internal light path beam for fundamental reference of the system phase measurement, which is generated by modulating high-frequency oscillation signal.

In the step 103, the receiver compares phases of the internal and external light path beam received respectively to output phase shift for eliminating a fundamental reference.

In the embodiment of the invention, the internal and external light path beams could be mixed with mixing signals, wherein the mixing signals could be the same high-frequency oscillation signal, or the same frequency and phase signal with a stable phase difference.

In the embodiment of the invention, both internal and external light path beams are laser.

In the embodiment of the invention, the receiver could receive either the internal light path beam or the external light path beam at first, wherein the receiver could be light emitting diode, light emitting triode, APD, optoelectronic multiplier, or the like.

Figure 2:
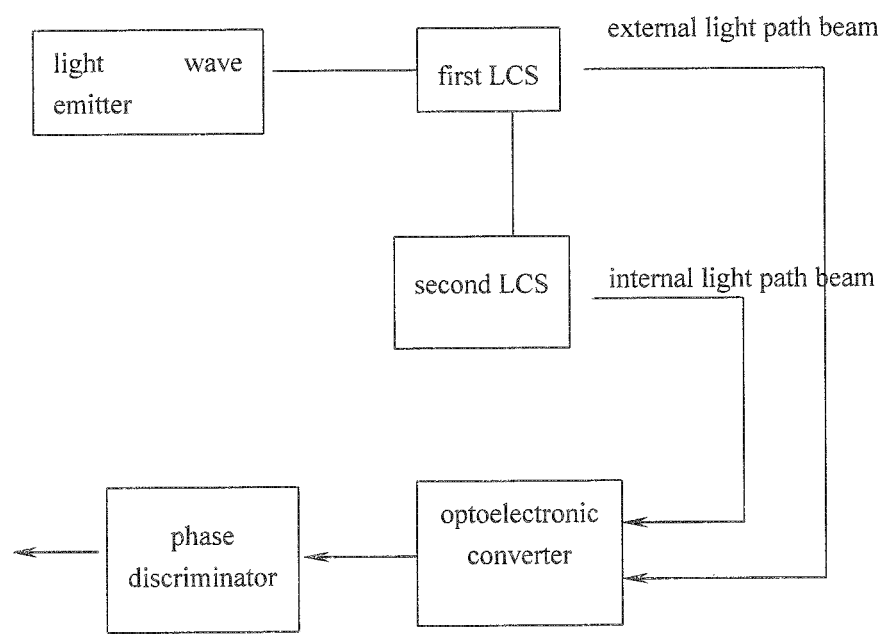
FIG. 2 is a schematic diagram of the phase measurement calibrating device based on the LCS principle in accordance with the present invention.

FIG. 2 is a schematic diagram of the double-emission and single-receiving phase measurement calibrating device based on the LCS principle in accordance with the present invention, in order to illustrate conveniently, this drawing only discloses information related to the embodiment of the invention, a high-frequency oscillation signal is modulated into the light wave, the light wave arrives at the tested target through the first LCS, as the external light path beam; and at the same time a part of the light wave is reflected by the first LCS and then passes through the second LCS, as the internal light path beam. The optoelectronic converter respectively coverts the internal and external light path beams for outputting to the phase discriminator, then the phase discriminator compares phases of the internal and external light path beam received respectively to output phase shift for eliminating a fundamental reference.

In the embodiment of the invention, the light wave emitter includes a clock generator, a modulator module circuit and a light source, wherein the driver drives the light-emitter to emit light, the light wave emitter of the present invention could be laser diode (LD), light emitting diode (LED) and other light-emitting element.

Both the first and second LCS includes a driving circuit, LCS, and an assistant optical element, wherein the assistant optical element help to make the first and second LCS in a closed system as a whole. The LCS could be crystal optoelectronic switch or other electro-optic switch.

In the embodiment of the invention, both the first and second LCS are directed to the optoelectronic converter, so that the light wave straight reaches the optoelectronic converter. There may be a reflector between the second LCS and the optoelectronic converter in order to change the light path, that is convenient to be received by the optoelectronic converter. Otherwise, there could be optical signal transmission lines connecting the second LCS and the optoelectronic converter, and the optical signal transmission lines maybe optical fiber or light line.

The optoelectronic converter could be light emitting diode, light emitting triode, APD, optoelectronic multiplier, or the like. The optoelectronic converter could receive either the internal light path beam or the external light path beam at first.

Figure 3:
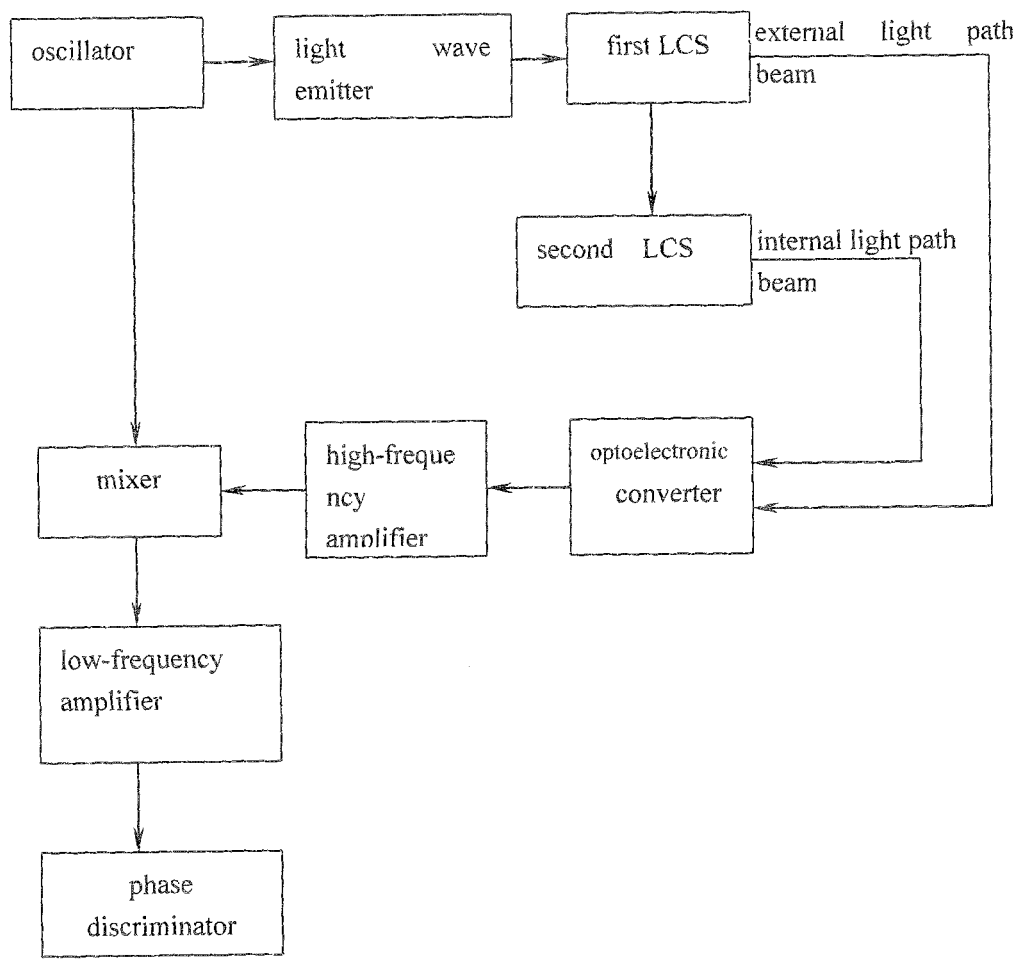
FIG. 3 is a schematic diagram of the phase measurement calibrating device based on the LCS principle in accordance with a first preferred embodiment of the present invention.

FIG. 3 shows one phase measurement calibrating device based on the LCS principle comprising: the oscillator, the light wave emitter, the first LCS, the second LCS, the optoelectronic converter, the high-frequency amplifier, the mixer, the low-frequency amplifier, and the phase discriminator. In order to illustrate conveniently, FIG. 3 only discloses information related to the embodiment of the invention.

The oscillator generates a First and second high-frequency oscillation signal of the same frequency and phase, and the light wave emitter receives the first high-frequency oscillation signal and modulates into light wave, then emits as optical signal. The optical signal arrives at the tested target through the first LCS, and then is reflected by the tested target, and the optoelectronic converter receives reflected optical signal, as external light path beam. The external light path beam is converted to electronic signal as high-frequency signal. The high-frequency amplifier amplifies and outputs the electronic signal from the optoelectronic converter. Then the mixer mixes the high-frequency amplified signal with the second high-frequency oscillation signal. The mixed signals are amplified by the high-frequency amplifier after being into the phase discriminator. At the same time, a part of the light wave is reflected by the first LCS and then passes through the second LCS, as the internal light path beam, then the phase discriminator discriminates respectively the internal and external light path beam to output phase shift for eliminating a fundamental reference.

In the embodiment of the invention, the oscillator could be crystal, crystal oscillator, phase-locked loops (PLL), direct digital frequency synthesis (DDS), or other frequency generator and circuit.

In the embodiment of the invention, the mixer could be analog multiplier, down-conversion mixer, or other electric mixer, such as light emitting diode, light emitting triode, APD, optoelectronic multiplier, and as the like, i.e., S9717 HAMAMATSU, AD230 and AD500 SILICON SENSOR.

In the embodiment of the invention, the optoelectronic converter and the mixer could be instead of the receiver which can meet the two functions of the optoelectronic converter and the mixer simultaneously, such as S9717 HAMAMATSU, AD230 and AD500 SILICON SENSOR. The receiver could be light emitting diode, light emitting triode, APD, and PMT as the like, for example, S9717 HAMAMATSU, AD230 and AD500 SILICON SENSOR.

In the embodiment of the invention, the high-frequency amplifier is used for receiving and amplifying the high-frequency signal, while the low-frequency amplifier is used for amplifying the low-frequency mixed signal. The high-frequency amplifier is expensive as compared to the low-frequency amplifier. Both the high-frequency amplifier and the low-frequency amplifier may be not adopted, or one of them may be not adopted, in the condition that other elements of the circuit have good properties. The high-frequency amplifier could not utilized if the receiver would instead the optoelectronic converter and the mixer, and then the receiver is straight connecting the low-frequency amplifier, which will makes cost down.

Figure 4:
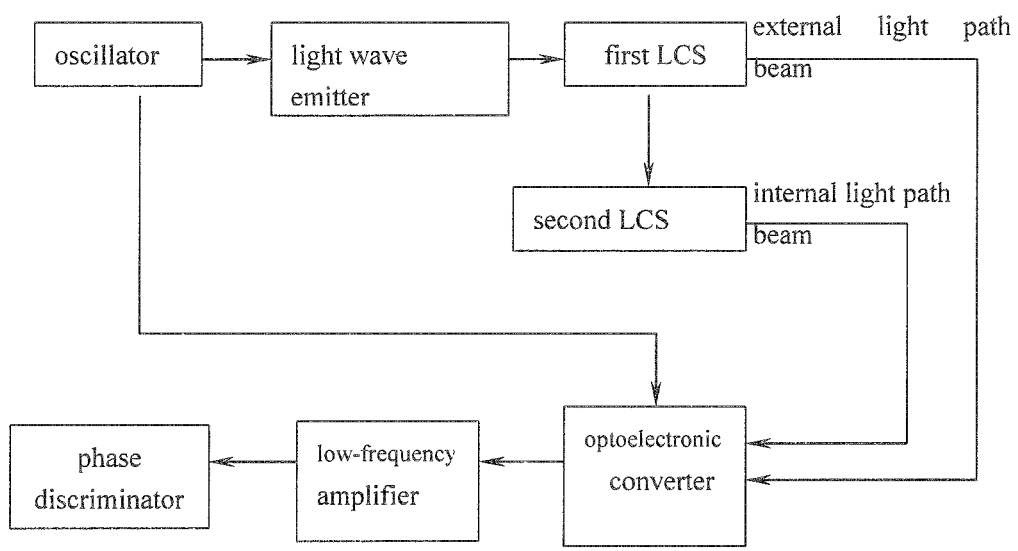
FIG. 4 is a schematic diagram of the phase measurement calibrating device based on the LCS principle in accordance with a second preferred embodiment of the present invention.

FIG. 4 shows the second embodiment of the invention. The phase measurement calibrating device includes the oscillator, the light wave emitter, the first LCS, the second LCS, the low-frequency amplifier and the phase discriminator. In order to illustrate conveniently, FIG. 4 only discloses information related to the embodiment of the invention.

The phase measurement calibrating device is further including an optoelectronic mixer used for respectively receiving internal and external light path beams, wherein the external light path beam is reflected by the tested target, then the internal and external light path beams are respectively mixed with mixing signal for outputting.

In this embodiment of the invention, the optoelectronic mixer is instead of the optoelectronic converter and the mixer, such as S9717 HAMAMATSU, AD230 and AD500 SILICON SENSOR.

Figure 5:
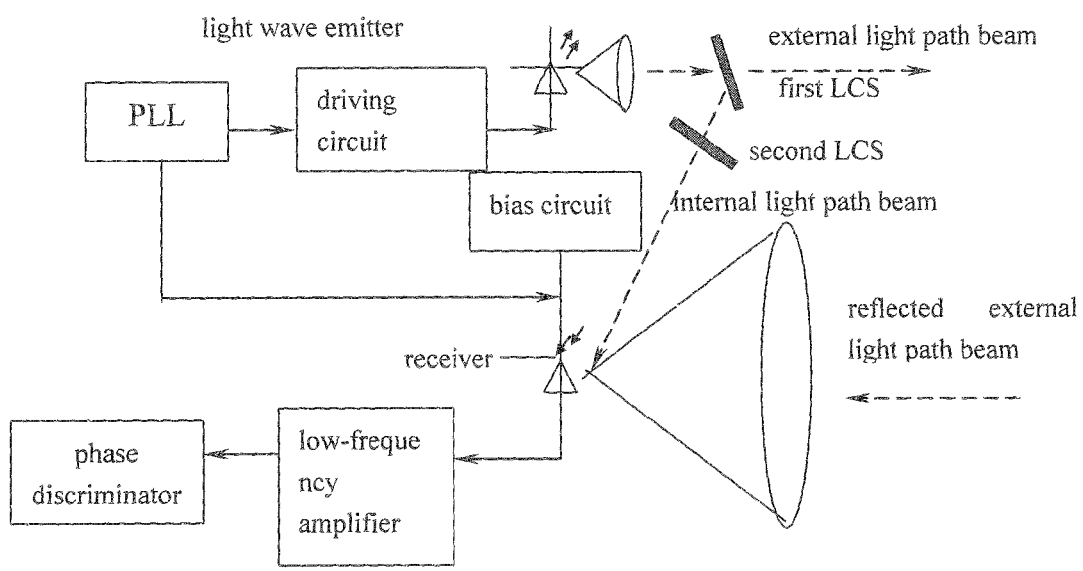
FIG. 5 is a schematic diagram of the phase measurement calibrating device based on the LCS principle in accordance with a third preferred embodiment of the present invention.
Figure 6:
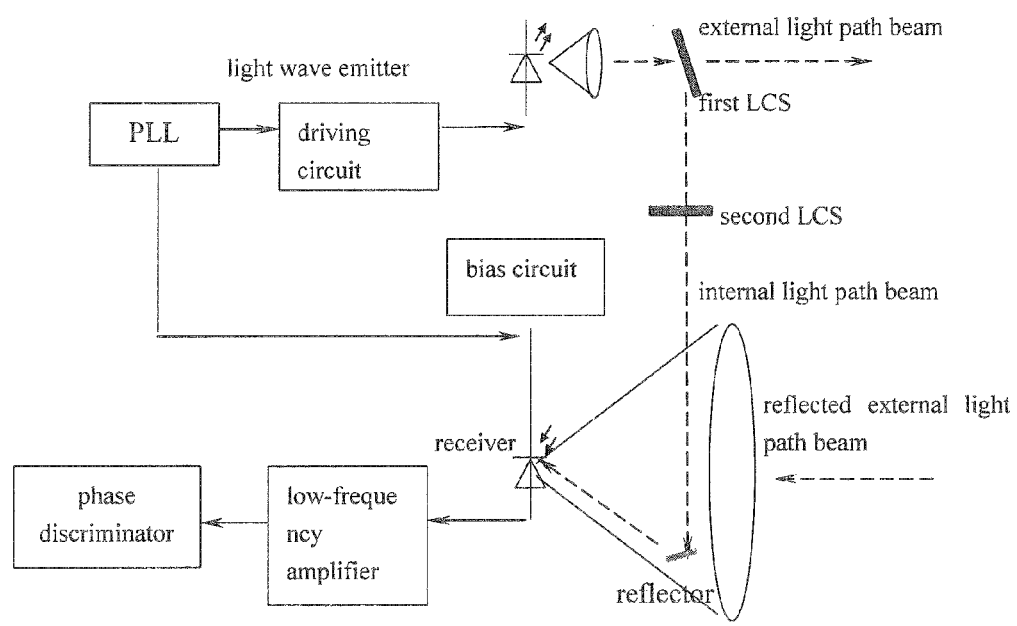
FIG. 6 is a schematic diagram of the phase measurement calibrating device based on the LCS principle in accordance with a fourth preferred embodiment of the present invention.
Figure 7:
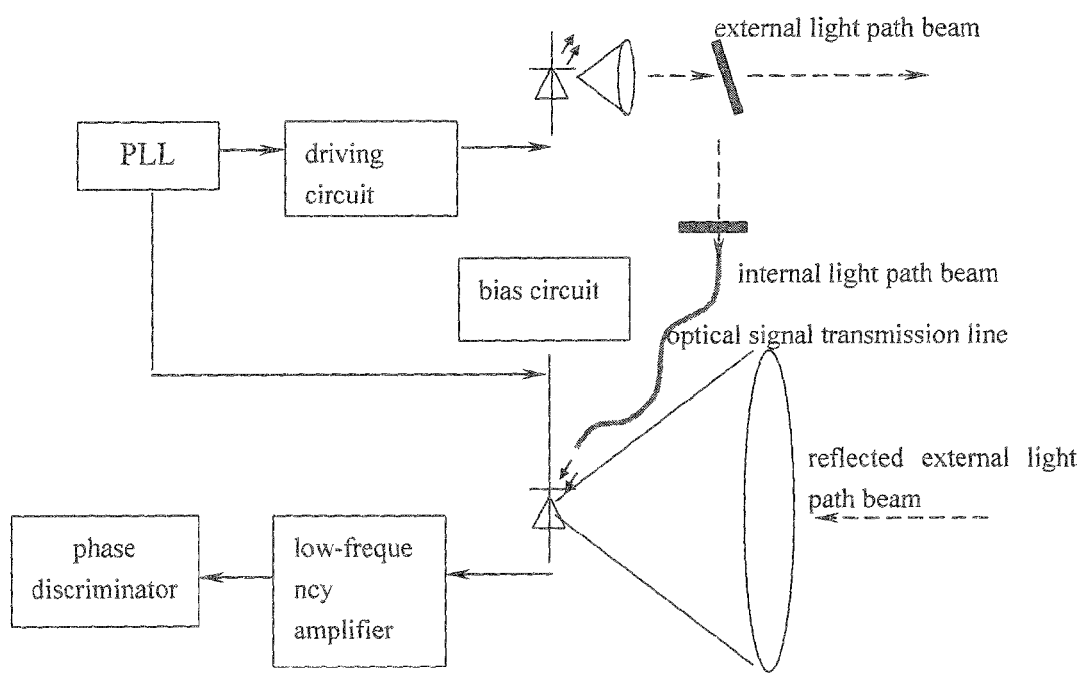
FIG. 7 is a schematic diagram of the phase measurement calibrating device based on the LCS principle in accordance with a fifth preferred embodiment of the present invention.

Referring to FIGS. 5-7, the structure of the phase measurement calibrating device based on the LCS principle includes PLL and driving circuit, which drive the light wave emitter to generate light wave by the high-frequency oscillation signal, a part of the light wave passes through the first LCS as the external light path beam when a part of the light wave is reflected by the first LCS simultaneously. The reflected light wave is through the second LCS as the internal path light wave. The internal and external light path beams are respectively received by a receiver, and then are into a bias circuit. The internal and external light path beams mix with a high-frequency mixing signal from PLL and implement optoelectronic conversion. Then the internal and external light path beams are amplified by the low-frequency amplifier for outputting to the phase discriminator. At the end the phase discriminator compares phases of the internal and external light path beam received respectively to output phase shift for eliminating a fundamental reference.

In the embodiment of the invention, the light wave emitter generates light wave to through the first LCS and aims to the receiver, so the light wave arrives at the receiver directly. Referring to FIG. 6, there might be a reflector group between the second LCS and the receiver to change the light path, that is benefit for receiving. Referring to FIG. 7, there may be optical signal transmission lines connecting the second LCS with the receiver, and the optical signal transmission line could be optical fiber, light line, or other optical element.

In these embodiments of the invention, the first LCS is used to put throughout off the external light path beam, and the light wave emitter generates light wave, and a part of the light wave is through the first LCS to reach the receiver directly.

Figure 8:
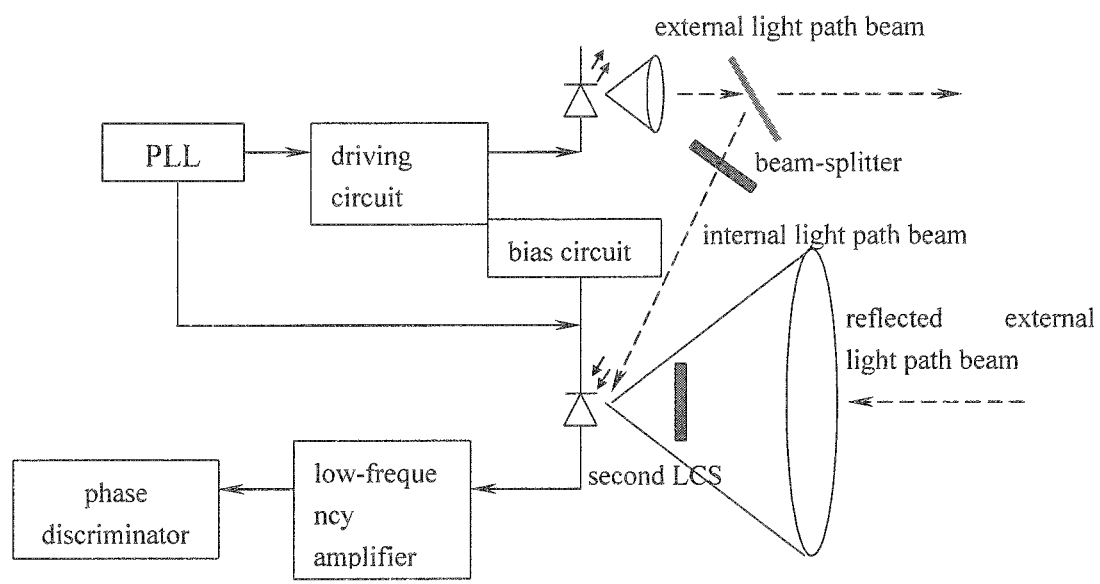
FIG. 8 is a schematic diagram of the phase measurement calibrating device based on the LCS principle in accordance with a sixth preferred embodiment of the present invention.
Figure 9:
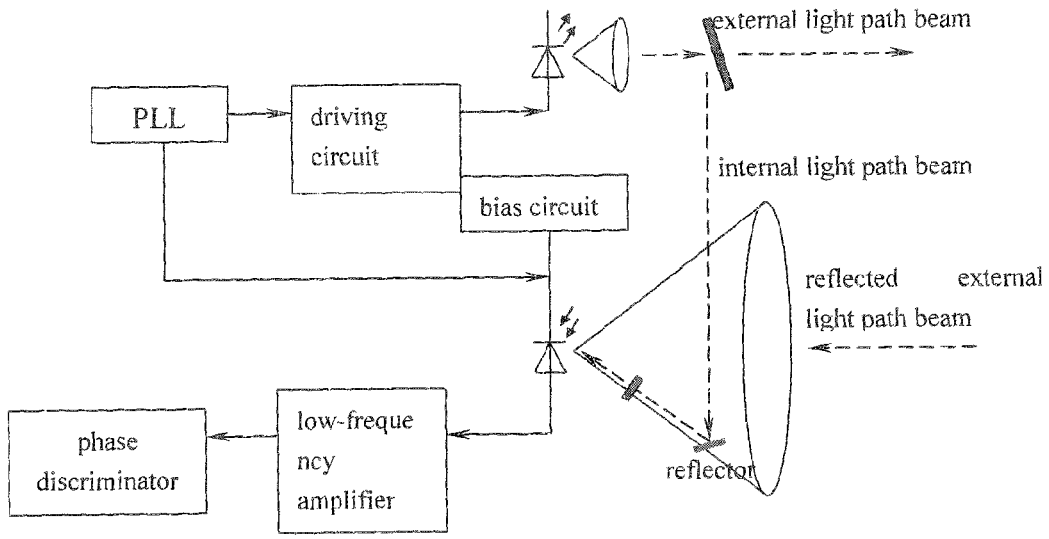
FIG. 9 is a schematic diagram of the phase measurement calibrating device based on the LCS principle in accordance with a seventh preferred embodiment of the present invention.
Figure 10:
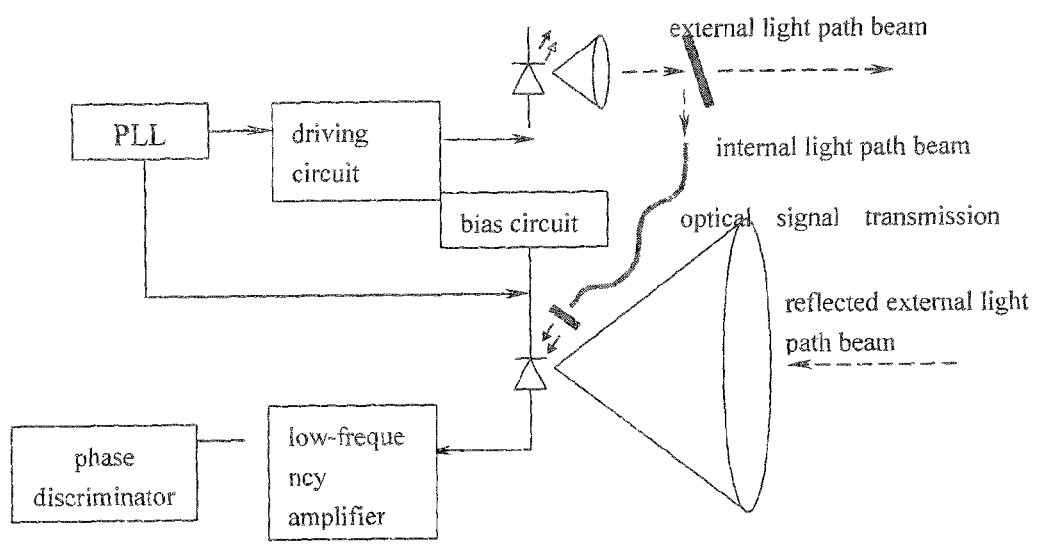
FIG. 10 is a schematic diagram of the phase measurement calibrating device based on the LCS principle in accordance with an eighth preferred embodiment of the present invention.

Any embodiment as shown in FIGS. 8-10 has the same function as the embodiment as shown in FIG. 5, wherein the position of the first LCS or the second LCS has changed. Referring to FIG. 8, there is a beam-splitter added in transmission path of the external light path beam in order to divide internal light path beam from the external light path beam. The first LCS is used to put throughout off the external light path beam. FIG. 9 shows that the internal light path beam is reflected by the reflector and then through the second LCS, the second LCS is used to put throughout off the internal light path beam. FIG. 10 shows that the second LCS is disposed in the back of optical signal transmission line to put throughout off the internal light path beam. According to the above embodiments, the position of the first LCS in transmission path of the external light path beam can be changed in order to put throughout off the external light path beam, and the position of the second LCS in transmission path of the internal light path beam can be changed in order to put throughout off the internal light path beam.

The single-emission and single-receiving phase measurement calibrating device based on the LCS principle, as shown in FIG. 5 and FIG. 8, is used for calibrating measuring device, such as continuous phase-laser measuring distance device and pulse laser phase-laser measuring distance device. And the phase measurement calibrating device combining with the measuring device can implement phase compensation due to the influence of environmental factors. In the embodiments of the invention, control circuit could be adopted to put throughout off the internal or external light path beam instead of the mechanical switch, and the control circuit makes the response time short, and there is short interval up to millisecond level between the receiving of the internal and external light path beam, so that the environment is thought to keep the same during circuit switching and the circuit doesn't influenced to obtain good measurement accuracy. The single-emission and single-receiving phase measurement calibrating device has short interval up to millisecond level, which removes the influence of common mode between APD and LD, so the measurement accuracy is higher than the way adopts double APDs or double LDs.

Figure 11:
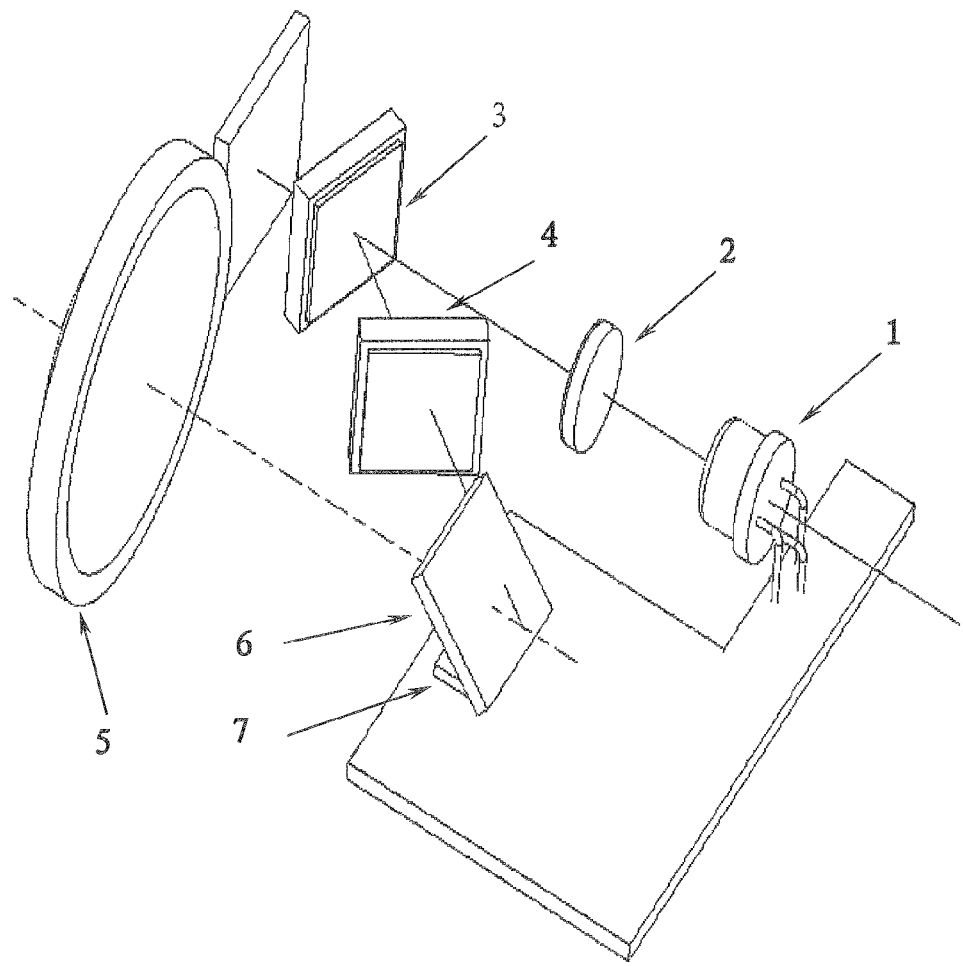
FIG. 11 is a three-dimensional exploded view of the phase measurement calibrating device in accordance with the present invention.
Figure 12:
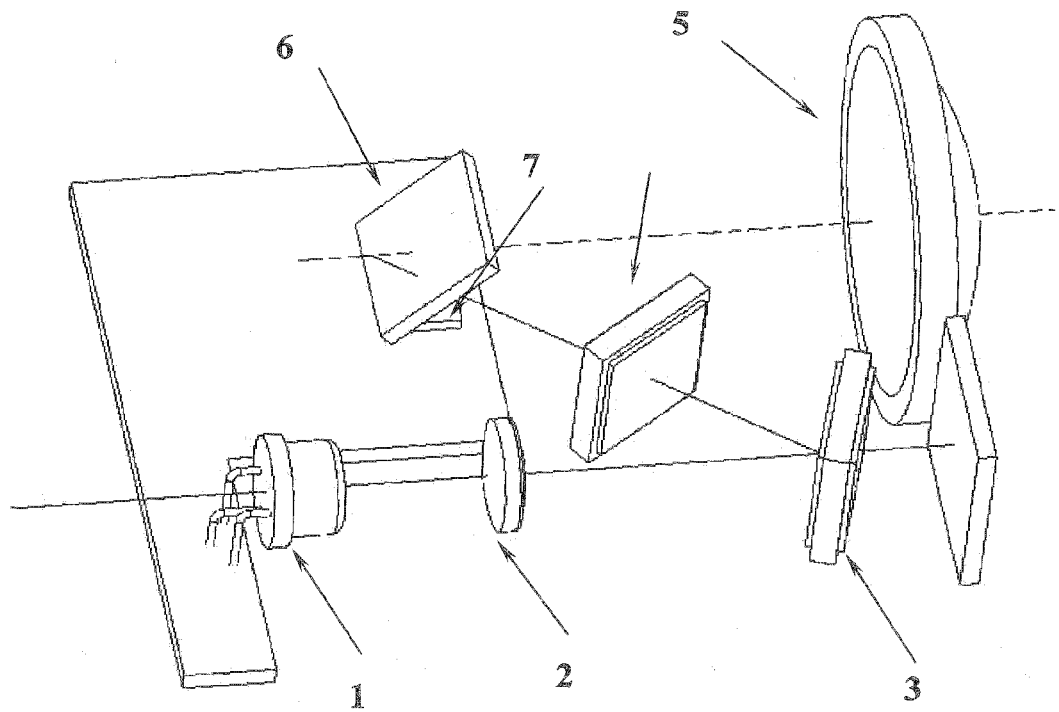
FIG. 12 is another three-dimensional exploded view of the phase measurement calibrating device.
Figure 13:
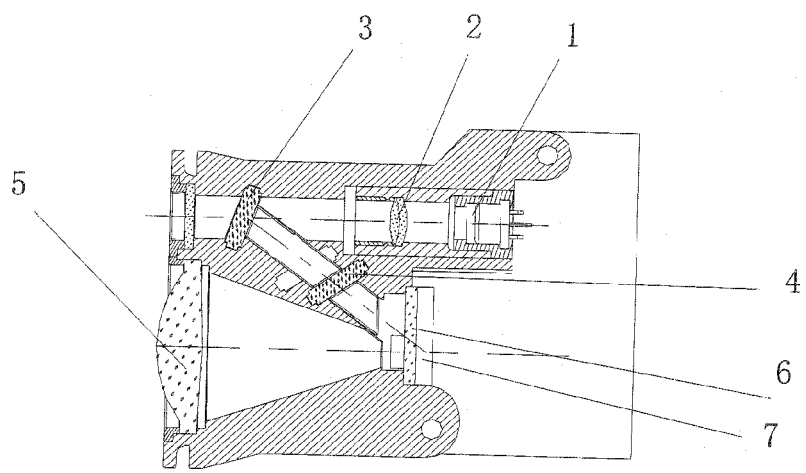
FIG. 13 is a sectional view of the phase measurement calibrating device.

Referring to FIGS. 11-13, the phase measurement calibrating device based on the LCS principle is comprising of the light wave emitter 1, the optoelectronic converter, the first LCS, the second LCS, the phase discriminator, the mixer, the receiver, the oscillator, and the amplifier, all of which are mounted on a base. A lens 2 is on the front of the light wave emitter 1, and the first LCS is on the front of the lens, when the light wave arrives at the tested target through the first LCS. The light wave reflected by the tested target passes through a receiving lens 5 mounted on the base. The receiver is on the back of the receiving lens 5, and there is another lens 6 disposed on the front of the receiver 7. The second LCS is disposed between the first LCS 3 and the receiver 7.

The phase discriminator adopts Fourier transform to compute phase. TI's single-chip MSP430 or SILICON LAB's single-chip C8051 or other equivalent chip can be chosen as microprocessor with integrated analog-to-digital converter. Either the mixer or the optoelectronic converter could be S9717 HAMAMATSU, AD230 or AD500 SILICON SENSOR. The receiver consists of the mixer and the optoelectronic converter, and the receiver could be S9717 HAMAMATSU, AD230, or AD500 SILICON SENSOR. The oscillator could be TI's CDCE925 PLL, or FUJITSU's MB15 PLL. The amplifier could be TI' OPA354, TI'OPA357, or ADI's AD8065.

The light wave emitter receives the first high-frequency oscillation signal and modulates into light wave, then a part of the light wave reaches the tested target through the first LCS as external light path beam; when a part of the light wave is reflected by the first LCS and then passes through the second LCS, as internal light path beam. The optoelectronic converter receives the external and internal light path beam and then converts them into electronic signals for output and the phase discriminator receives the internal and external light path beam respectively and then compares phases of the internal and external light path beam to output phase shift for eliminating a fundamental reference.

In the embodiment of the invention, both the first and second LCS are directed to the optoelectronic converter, so that the light wave straight reaches the optoelectronic converter.

There might be one or more reflectors between the second LCS and the optoelectronic converter in order to change the light path, that is convenient for the light path to be received by the optoelectronic converter.

Otherwise, there could be optical signal transmission lines connecting the second LCS and the optoelectronic converter, and the optical signal transmission lines may be optical fiber or light line.

The receiver may consist of the optoelectronic converter and the mixer.

The receiver may be a optoelectronic mixer.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A phase measurement calibrating method based on the liquid crystal shutter principle, comprising the steps of:
a light wave emitted by a light wave emitter to a tested target through a first liquid crystal shutter, being reflected by the tested target, being focused by an optical device, being received by a receiver, then being used as an external light path beam of the measurement system;
while the light wave is passing through the first liquid crystal shutter, a part of the light wave being reflected by the first liquid crystal shutter to pass through a second liquid crystal shutter, the light wave passing through the second liquid crystal shutter being received directly by the receiver and used as an internal light path beam for fundamental reference of the system phase measurement;
the first liquid crystal shutter and the second liquid crystal shutter being switched respectively while the system operates, so that the receiver being utilized for comparing phases of the internal and external light path beam received respectively to output phase shift for eliminating a fundamental reference.

2. The phase measurement calibrating method based on the liquid crystal shutter principle as claimed in claim 1, further comprising:
an oscillator generating a first and second high-frequency oscillation signal of the same frequency and the same phase, and the light wave emitter receiving and modulating the first high-frequency oscillation signal, then emitting as optical signal;
the optical signal arriving at the tested target through the first liquid crystal shutter, then reflected by the tested target, and an optoelectronic converter receiving and converting reflected external light path beam to output electronic signal as high-frequency signal, the electronic signal being amplified by a high-frequency amplifier, and a mixer mixing the high-frequency amplified signal with the second high-frequency oscillation signal before outputting mixed signals, and the mixed signal being into a phase discriminator after being amplified by a low-frequency amplifier, and the internal and external light path beam being respectively discriminated by the phase discriminator, then phase discriminator being outputting phase difference signal.

3. A phase measurement calibrating device based on the liquid crystal shutter principle, comprising: a light wave emitter, a lens, a first liquid crystal shutter, a second liquid crystal shutter and a receiver, all above are mounted on a base, and the lens is disposed on the front of the light wave emitter, and the first liquid crystal shutter is disposed on the front of the lens. and a receiving lens is mounted on the base, and the receiver is deposed on the back of the receiving lens, and the lens is disposed on the front of the receiver, and the second liquid crystal shutter is between the first liquid crystal shutter and the receiver;
wherein the phase measurement calibrating device based on the liquid crystal shutter principle further comprising: an optoelectronic converter, a phase discriminator, a mixer, an oscillator and an amplifier all above are mounted on the base,
the oscillator generates a first and second high-frequency oscillation signals of the same frequency and the same phase, then the light wave emitter receives and modulates the first high-frequency oscillation signal, then emits as optical signal, and the optical signal arrives at the tested target through the first liquid crystal shutter, and a part of the light wave is reflected by the tested target before being received by the optoelectronic converter as external light path beam, and then the external light path beam being converted to electronic signal as high-frequency signal for outputting; and
the mixer receives and mixes the high-frequency signal with the second high-frequency oscillation signal for outputting and the mixing signal is into the phase discriminator after being amplified by a low-frequency amplifier, and the receiver compares phases of the internal and external light path beam received respectively to output phase shift for eliminating a fundamental reference.

4. The phase measurement calibrating device based on the liquid crystal shutter principle as claimed in claim 3, wherein the receiver comprises an optoelectronic converter and a mixer.

5. The phase measurement calibrating device based on the liquid crystal shutter principle as claimed in claim 3, wherein both the first and second liquid crystal shutter are directed to the optoelectronic converter.

6. The phase measurement calibrating device based on the liquid crystal shutter principle as claimed in claim 3, wherein a reflector is positioned between the second liquid crystal shutter and the optoelectronic converter.

7. The phase measurement calibrating device based on the liquid crystal shutter principle as claimed in claim 3, wherein the second liquid crystal shutter and the optoelectronic converter is connected by an optical signal transmission line.

8. The phase measurement calibrating device based on the liquid crystal shutter principle as claimed in claim 3, wherein the receiver is a optoelectronic mixer.

9. A phase measurement ranging device based on the liquid crystal shutter principle, comprising:
a light wave emitter, used for emitting light wave;
a first liquid crystal shutter, used for receiving the light wave and transmitting to a tested target;
a receiving lens, used for receiving reflected light wave by the tested target;
a receiver, used for receiving a focused light wave as an external light path beam of the measurement system;
a second liquid crystal shutter, used for receiving part of reflected light wave by the first liquid crystal shutter, and transmitting to the receiver as an internal light path beam for fundamental reference of the system phase measurement;
wherein the first and second liquid crystal shutter are switched respectively, therefore, the receiver compares phases of the internal and external light path beam received respectively to output phase shift for eliminating a fundamental reference.

* * * * *

UNITED STATES PATENT AND TRADEMARK OFFICE
Certificate

Patent No. 8,525,977 B2                                   Patented: September 3, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Xin Du, Changzhou (CN).

Signed and Sealed this Fourteenth Day of January 2014.

*ISAM ALSOMIRI*
*Supervisory Patent Examiner*
Art Unit 3645
Technology Center 3600